United States Patent
Gosis et al.

(10) Patent No.: US 8,029,191 B2
(45) Date of Patent: Oct. 4, 2011

(54) SYSTEM AND METHOD FOR CONTROLLING TEMPERATURE INDICATORS

(75) Inventors: Anatoly Gosis, Palatine, IL (US); Shannon B. Reading, Easton, PA (US); Joseph E. Fabin, Elmwood Park, IL (US); Frank Otte, Mount Prospect, IL (US)

(73) Assignee: Illinois Tool Works Inc., Glenview, IL (US)

( * ) Notice: Subject to any disclaimer, the term of this patent is extended or adjusted under 35 U.S.C. 154(b) by 596 days.

(21) Appl. No.: 12/034,956

(22) Filed: Feb. 21, 2008

(65) Prior Publication Data
US 2008/0137713 A1    Jun. 12, 2008

Related U.S. Application Data

(63) Continuation-in-part of application No. 11/548,355, filed on Oct. 11, 2006.

(51) Int. Cl.
G01K 13/00    (2006.01)
G01K 1/00    (2006.01)
G01K 11/12    (2006.01)

(52) U.S. Cl. ......... 374/208; 374/100; 374/162; 116/216

(58) Field of Classification Search ............ 374/100, 374/161–163, 179, 183, 185, 141, 208, 198–200; 116/216; 73/866.5
See application file for complete search history.

(56) References Cited

U.S. PATENT DOCUMENTS

| | | | |
|---|---|---|---|
| 1,603,713 A | | 10/1926 | Peterson |
| 1,983,728 A | | 12/1934 | Bafetti |
| 2,020,676 A | | 11/1935 | Ellis et al. |
| 2,875,614 A | | 3/1959 | Dobrin et al. |
| 3,057,072 A | * | 10/1962 | Kohlmeier ............... 33/501 |
| 3,125,993 A | * | 3/1964 | Zepell ............... 401/106 |
| 3,183,892 A | * | 5/1965 | Malm ............... 401/111 |
| 3,447,071 A | | 5/1969 | Beckman et al. |
| 3,785,336 A | | 1/1974 | Roszkowski |
| 3,920,156 A | * | 11/1975 | Hicks ............... 222/80 |
| 3,933,149 A | * | 1/1976 | Salera et al. ............... 600/549 |

(Continued)

FOREIGN PATENT DOCUMENTS

GB    1481676 A    8/1997

(Continued)

OTHER PUBLICATIONS

Tempilstik Temperature Indicators Product Specifications Guide, Tempil, Inc., catalog, www.tempil.com/productdisplay.asp., U.S.A.

(Continued)

*Primary Examiner* — Gail Verbitsky
(74) *Attorney, Agent, or Firm* — Quarles & Brady LLP

(57) ABSTRACT

A system and method for controlling a temperature indicator stick includes a housing having an interior configured to receive the temperature indicator stick configured to indicate a predetermined temperature through a physical change or a chemical when exposed to the predetermined temperature. A roller drive is supported by the housing to engage the temperature indicator stick. Accordingly, rotation of the drive roller causes a retraction or advancement of the temperature indicator stick to and from the interior of the housing. Additionally, the housing and temperature indicator stick may include a key system to keep the temperature indicator stick in a substantially fixed rotational position with respect to the housing as the temperature indicator stick advanced from and retracted into the housing.

17 Claims, 5 Drawing Sheets

U.S. PATENT DOCUMENTS

| | | | |
|---|---|---|---|
| 3,935,743 A | | 2/1976 | Brodie et al. |
| 4,075,035 A | | 2/1978 | Trevedy |
| 4,120,818 A | | 10/1978 | Swindells et al. |
| 4,436,032 A | | 3/1984 | van Ouwerkerk |
| 4,467,815 A | * | 8/1984 | O'Brien et al. ............... 600/553 |
| 4,554,565 A | | 11/1985 | Kito et al. |
| 4,588,307 A | | 5/1986 | Palti |
| 4,746,046 A | * | 5/1988 | Frye ............... 227/120 |
| 4,777,828 A | | 10/1988 | Ferris |
| 4,875,782 A | | 10/1989 | Fox |
| 4,963,194 A | | 10/1990 | Mele |
| 5,011,445 A | | 4/1991 | Nakasuji et al. |
| 5,234,136 A | * | 8/1993 | Kopis ............... 222/391 |
| 5,318,372 A | | 6/1994 | Besthorne |
| 5,401,100 A | | 3/1995 | Thackston et al. |
| D360,223 S | | 7/1995 | Lamber |
| 5,499,597 A | | 3/1996 | Kronberg |
| 5,622,137 A | | 4/1997 | Lupton et al. |
| 5,682,682 A | * | 11/1997 | Renfrew et al. ............... 33/556 |
| 5,918,981 A | | 7/1999 | Ribi |
| 5,932,318 A | | 8/1999 | Uchiyama |
| 5,988,914 A | * | 11/1999 | Kageyama et al. ............... 401/52 |
| 6,008,757 A | * | 12/1999 | Boulianne et al. ....... 342/357.27 |
| 6,022,648 A | | 2/2000 | Jacobson et al. |
| 6,039,177 A | | 3/2000 | Swanson et al. |
| 6,113,520 A | | 9/2000 | Greiner |
| 6,228,804 B1 | | 5/2001 | Nakashima |
| 6,231,230 B1 | * | 5/2001 | Baldock et al. ............... 374/208 |
| 6,361,839 B1 | | 3/2002 | Salgado et al. |
| 6,536,306 B1 | | 3/2003 | Harris |
| 6,547,470 B2 | * | 4/2003 | Legg ............... 401/195 |
| 6,712,996 B2 | | 3/2004 | Wu et al. |
| 6,786,897 B2 | | 9/2004 | McIe et al. |
| 6,857,777 B2 | | 2/2005 | Desai et al. |
| 6,960,043 B2 | * | 11/2005 | Deonarine ............... 403/109.4 |
| 7,213,969 B2 | * | 5/2007 | Russak et al. ............... 374/208 |
| 7,316,506 B2 | | 1/2008 | Deonarine |
| 7,374,335 B2 | | 5/2008 | Gotthold et al. |
| D573,043 S | | 7/2008 | Knight |
| 7,465,086 B1 | | 12/2008 | Foreman, Jr. |
| 7,494,465 B2 | | 2/2009 | Brister et al. |
| 7,507,025 B2 | | 3/2009 | Lumpkin |
| 7,520,668 B2 | * | 4/2009 | Chen ............... 374/121 |
| 7,530,751 B2 | * | 5/2009 | Journe ............... 401/108 |
| 2003/0013985 A1 | | 1/2003 | Saadat |
| 2003/0076868 A1 | | 4/2003 | Desai et al. |
| 2003/0076869 A1 | | 4/2003 | Deonarine |
| 2003/0077112 A1 | | 4/2003 | Deonarine |
| 2003/0120171 A1 | | 6/2003 | Diamantopoulos et al. |
| 2003/0147450 A1 | | 8/2003 | Witonsky et al. |
| 2004/0240520 A1 | | 12/2004 | Faries et al. |
| 2004/0243021 A1 | | 12/2004 | Murphy et al. |
| 2005/0273126 A1 | | 12/2005 | Beaupre |
| 2006/0008699 A1 | | 1/2006 | Um |
| 2006/0121229 A1 | | 6/2006 | Nagae |
| 2007/0047620 A1 | * | 3/2007 | Lumpkin ............... 374/208 |
| 2007/0171957 A1 | | 7/2007 | Harris |
| 2010/0106169 A1 | * | 4/2010 | Niese et al. ............... 606/144 |

FOREIGN PATENT DOCUMENTS

| | | |
|---|---|---|
| WO | 2008045155 A | 4/2008 |

OTHER PUBLICATIONS

PCT International Search Report.

PCT Search Report dated Apr. 14, 2009. pp. 1-2.

United States Patent and Trademark Office, Office Action Summary and Detailed Action, U.S. Appl. No. 11/548,355, Sep. 9, 2009, 8 pages.

United States Patent and Trademark Office, Office Action Summary and Detailed Action, U.S. Appl. No. 11/548,355, Mar. 31, 2010, 6 pages.

United States Patent and Trademark Office, Advisory Action Before the Filing of an Appeal Brief, U.S. Appl. No. 11/548,355, Jun. 18, 2010, 3 pages.

United States Patent and Trademark Office, Advisory Action Before the Filing of an Appeal Brief, U.S. Appl. No. 11/548,355, Jul. 26, 2010, 2 pages.

* cited by examiner

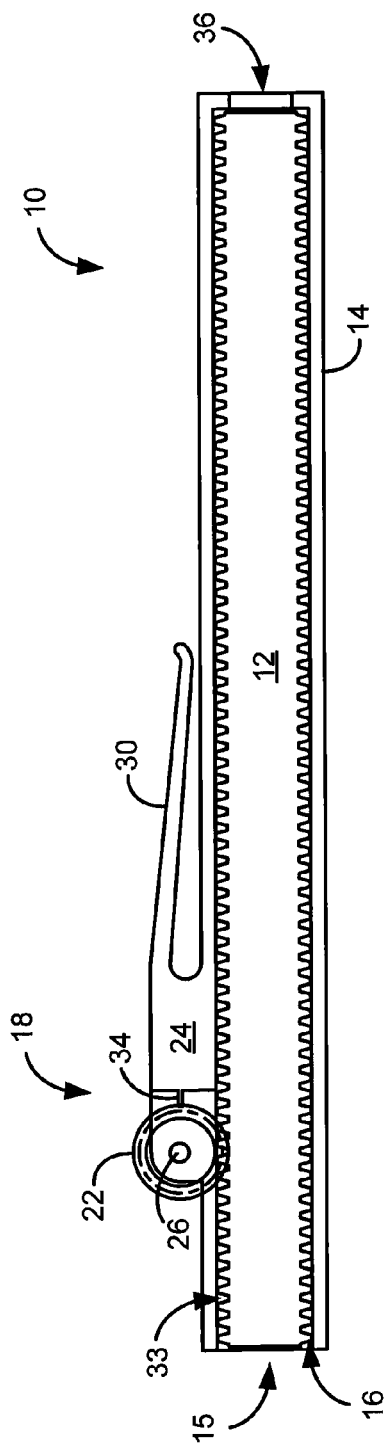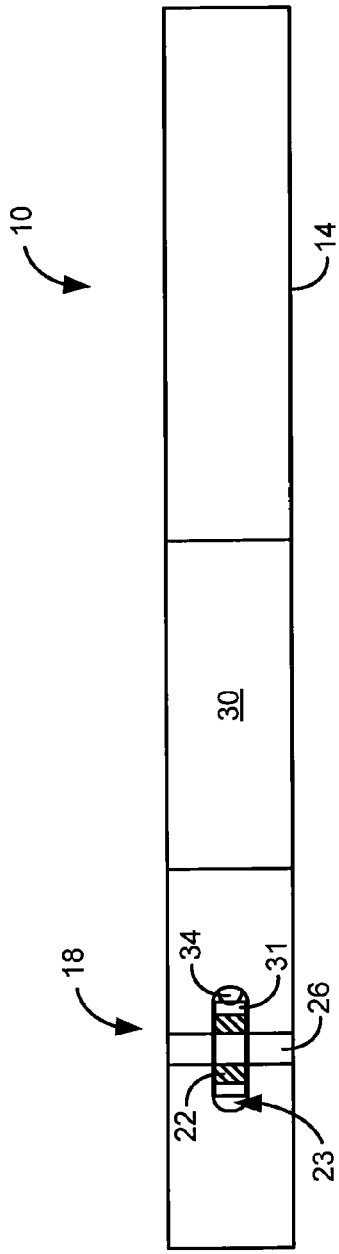

SYSTEM AND METHOD FOR CONTROLLING TEMPERATURE INDICATORS

REFERENCE TO RELATED APPLICATIONS

This application is a continuation-in-part of U.S. patent application Ser. No. 11/548,355, filed Oct. 11, 2006, and entitled "SYSTEM AND METHOD FOR CONTROLLING TEMPERATURE INDICATORS."

STATEMENT REGARDING FEDERALLY SPONSORED RESEARCH OR DEVELOPMENT

Not applicable.

BACKGROUND OF THE INVENTION

The present invention relates generally to temperature indicators and, more particularly, to a system and method for controlling temperature indicator sticks by allowing an individual to extend and retract a temperature indicator stick quickly and easily.

Various temperature detection monitors are used in the welding, metal fabrication, and heat treatment industries to measure temperatures of materials. Determining surface temperatures is important during welding and metal fabrication processes, such as pre-heat and post-weld heat treatment. Temperature monitoring is also important for determining operating temperatures of various mechanical, electrical, and hydraulic systems and components.

Temperature indicating sticks are commonly used to measure temperature. The sticks are often enclosed within a protective housing that includes an adjustable holder for positioning the temperature indicator stick relative to the housing. These adjustable holders use gravity and a fixable collet to adjust and fix the position of the temperature indicator stick with respect to the housing. These holder systems are somewhat limited in their ability to accurately control the position of the temperature indicator stick with respect to the housing or to fix the temperature indicator stick in a desired position. For example, an operator is typically required to use one hand to hold the housing and/or temperature indicator stick and the other hand to manipulate the collet. Hence, both of the operator's hands must be dedicated to adjusting the temperature indicator stick. In the case of the welding, metal fabrication, and heat treatment industries, this often means that the operator must remove heat-resistant gloves to manipulate the temperature indicator stick.

Additionally, when the temperature indictor stick is applied to the workpiece, the pressure exerted on the stick during marking often causes the stick to retract into the housing. In this case, the operator must again dedicate both hands to repositioning the temperature indicator stick before continuing to mark the object.

Accordingly, some operators are inclined to remove the temperature indicator stick from the housing. However, without a housing and holder, the relatively fragile or brittle temperature indicator stick can be easily broken. Furthermore, the housings typically include labeling that identifies the particular temperature rating of the temperature indicator stick. In this case, when the temperature indicator stick is removed from the housing, it may become indistinguishable from other temperature indicator sticks, even though the sticks are designed to indicate different temperatures.

In accordance with another aspect of the invention, Therefore, it would be desirable to have a system and method for quickly and easily controlling the position of a temperature indicator stick with respect to an associated housing.

BRIEF SUMMARY OF THE INVENTION

The present invention overcomes the aforementioned drawbacks by providing a system and method for accurately adjusting the position of a temperature indicator stick with respect to an associated housing that can be controlled using only a single hand, even when wearing gloves or the like. Furthermore, the system and method is designed to protect against inadvertent repositioning of the temperature indicator stick.

In accordance with one aspect of the present invention, a system is disclosed for controlling a temperature indicator stick configured to indicate a predetermined temperature through a physical or chemical change when exposed to the predetermined temperature. The system includes a housing having an interior configured to receive a temperature indicator stick. A gear is supported by the housing that extends from beyond an exterior of the housing into the interior of the housing to engage the temperature indicator stick. Accordingly, rotation of the gear causes a retraction or advancement of the temperature indicator stick to and from the housing.

In accordance with another aspect of the present invention, a system is disclosed for controlling a temperature indicator stick configured to indicate a predetermined temperature through a physical or chemical change at the predetermined temperature. The system includes a housing extending along a longitudinal axis to form a substantially hollow interior along the longitudinal axis. An actuation mechanism is supported by the housing that has a rotational axis substantially perpendicular to the longitudinal axis. The system also includes a temperature indicator stick arranged within the interior of the housing that extends along the longitudinal axis and engages the actuation mechanism. As such, rotation of the actuation mechanism about the rotational axis causes linear motion of the temperature indicator stick along the longitudinal axis.

In accordance with yet another aspect of the invention, a method of manufacturing a temperature indicator that includes a temperature indicator stick configured to indicate a predetermined temperature through a physical or chemical change at the predetermined temperature is disclosed. The method includes engaging a gear with an elongated housing to extend into an interior of the elongated housing and provide access to a portion of the gear from an exterior of the elongated housing. The method also includes arranging a temperature indicator stick within the interior of the elongated housing to engage the gear so that rotation of the gear from the exterior of the elongated housing adjusts a position of the temperature indicator stick with respect to the elongated housing.

In accordance with still another aspect of the invention, a temperature indicator stick system configured to indicate a predetermined temperature when exposed to the predetermined temperature is disclosed that includes a housing having an interior configured to receive a temperature indicator stick. The temperature indicator stick system also includes a drive roller supported by the housing to engage the temperature indicator stick. Accordingly, rotation of the drive roller causes retraction or advancement of the temperature indicator stick to and from the interior of the housing.

In accordance with another aspect of the invention, a temperature indicator stick system configured to indicate a predetermined temperature, the temperature indicator stick system is disclosed that includes a housing extending along a longitudinal axis to form a substantially hollow interior along the longitudinal axis. The temperature indicator stick system also includes a drive mechanism supported by the housing, a temperature indicator stick arranged within the interior of the housing and having a keyed shape extending along the longitudinal axis, and an opening formed at one end of the longitudinal axis to provide access to the hollow interior and having a geometry configured to mate with the keyed shape formed on the temperature indicator stick. Accordingly, actuation of the drive mechanism causes retraction or advancement of the temperature indicator stick to and from the interior of the housing through the opening. Also, the geometry of the opening holds the temperature indicator stick, through the keyed shape, in a substantially fixed axial position with respect to the housing as the temperature indicator stick is moved to and from the interior of the housing through the opening.

In accordance with yet another aspect of the invention, a temperature indicator stick configured to indicate a predetermined temperature, the temperature indicator stick is disclosed that includes an elongated stick extending from a first end to a second end to form a shaft extending therebetween. The elongated stick is formed of a matter configured to indicate a predetermined temperature through at least one of physical and chemical change when exposed to the predetermined temperature. A keyed shape is formed that extends in a substantially straight line along the shaft between the first end and the second end.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and:

FIG. 2 is a side-elevational, cross-sectional view of the temperature indicating system of FIG. 1;

FIG. 3 is a plan view of the temperature indicating system of FIGS. 1 and 2;

DETAILED DESCRIPTION OF THE INVENTION

Figure 1:
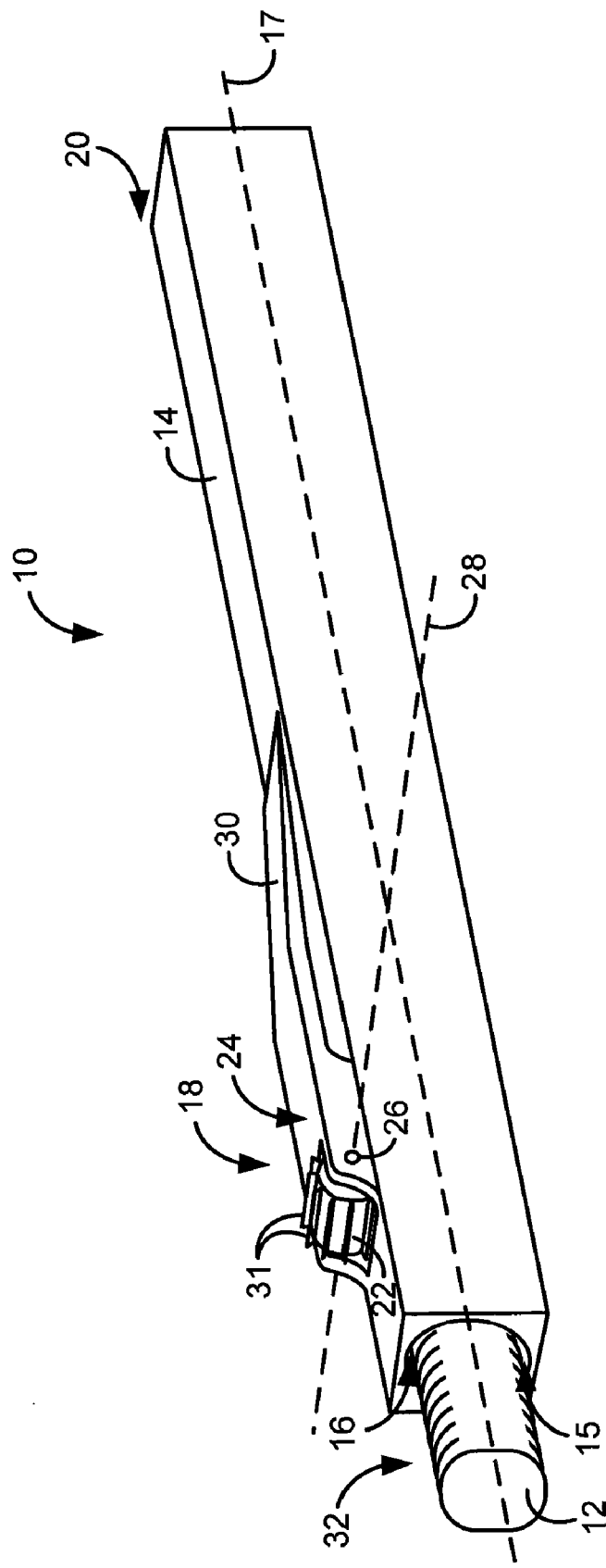
FIG. 1 is a perspective view of a temperature indicating system in accordance with the present invention.

Referring now to FIG. 1 a temperature indicator system 10 includes temperature indicator stick 12 that is arranged at least partially within a housing 14 through an opening 15 formed in the housing 14. In particular, the stick 12 is an elongated member that extends through an interior 16 of the housing 14 along a longitudinal axis 17 of the housing 14. The housing 14 is designed to protect the temperature indicator stick 12 from accidental or superficial damage. As will be described in detail below, the temperature indicator stick 12 is formed from a material that is designed to undergo a physical or chemical change when subjected to a predetermined temperature to, thereby, indicate the predetermined temperature. For example, the temperature indicator stick 12 may melt or change colors when subjected to a predetermined temperature.

Such temperature indicator sticks 12 are often formed of a relatively brittle or fragile material that is susceptible to cracking, breaking, or other damage. In this regard, the housing 14 may be formed of a ridged material designed to protect the temperature indicator stick 12 from damage. For example, the housing 14 may be formed from a metal, such as aluminum, steel, or brass, or may be a plastic-type material.

A control system 18 is included that extends along a portion of the exterior 20 of the housing 14. The control system 18 is designed to provide easy and accurate control of the position of the temperature indicator stick 12 with respect to the housing 14, even when controlled by a single hand.

Referring to FIGS. 1 and 2, the control system 18 includes an actuation mechanism in the form of a gear 22 that is supported in an opening 23 in the housing 14 by a mounting extension 24 that rises above the housing 14. The mounting extension 24 partially surrounds the opening 23 in the housing 14 and receives a pin 26 that extends through opposing sides of the mounting extension 24 to support the gear 22 along a rotational axis 28 extending transversely, and substantially perpendicular, to the longitudinal axis 17 of the housing 14. Hence, the gear 22 extends into the interior 16 of the housing 14 to engage the temperature indicator stick 12 and extends above the housing 14 and mounting extension 24 to present, as will be described in detail below, a means to easily and accurately control the position of the temperature indicator stick 12 within the housing 14. Extending from the mounting extension 24, away from the gear 22, is an optional clip 30 that is designed to facilitate mounting the temperature indicator system 10 on clothing or other devices.

The gear 22 includes a plurality of teeth 31 designed to engage a textured portion 32 of the temperature indicator stick 12. In accordance with one embodiment, it is contemplated that the textured portion 32 includes a plurality of reciprocal teeth 33 that form a rack extending along at least one side of the temperature indicator stick 12. However, as will be described below, the temperature indicator stick 12 and the textured portion 32 may include a variety of configurations and may be manufactured through a variety of methods.

The rack-and-pinion system created by the gear 22 and temperature indicator stick 12 allows a user to easily control positioning of the temperature indicator stick 12 with respect to the housing 14. For example, an operator can accurately control and adjust the position of the indicator stick 12 by rotating the gear 22 toward or away from the opening 15 through which the temperature indicator stick 12 has been loaded into the housing 14. Furthermore, this process can be readily achieved using a single hand. To do so, the housing 14 is held in the operator's hand and the thumb is used to rotate the gear 22 in the desired direction by rolling the thumb over the exposed control surface of the gear 22. In particular, by rotating the gear 22 toward the opening 15, the temperature indicator stick 12 is retracted into the housing 14 and, by rotating the gear 22 away from the opening 15, the temperature indicator stick 12 is extended from the housing 14. Thus, rotation of the gear 22 in a given direction causes reciprocal motion by the temperature indicator stick 12.

Referring now to FIGS. 1-3, the temperature indicator system 10 may include a variety of optional features designed to enhance usability. For example, an indexer 34 may be included to meter extension and retraction of the temperature indicator stick 12 and to provide the operator with feedback regarding the extension and retraction of the temperature indicator stick 12. The indexer 34 may be formed as a tab that extends into the rotational arc of the gear 22. Accordingly, as the gear 22 is rotated, the teeth 31 impact the indexer 34. Upon application of a sufficient force, the indexer 34 is displaced by a tooth 31, which results in a clicking noise. The rotational resistance and/or audible clicking caused by the indexer 34 interfering with each tooth 31 as it is rotated provides feedback to the user regarding the progress of extending or retracting the temperature indicator stick 12.

Additionally, although it is contemplated that the fitting between the pin 26 and the mounting extension 24 provides sufficient friction to secure the temperature indicator stick 12 against accidental extension or retraction, the indexer 34 provides an additional frictional force against accidental or undesired movement of the temperature indicator stick 12 within the housing 14. Furthermore, due to the readily accessible position of the control system 18 along the housing 14, an operator can secure the temperature indicator stick 12 against accidental or undesired movement, such as when marking a surface, by restricting rotation of the gear 22 using the operator's thumb or a finger. Advantageously, all of these operations can be performed even when the operator is wearing gloves or other apparel that would otherwise impede controlling intricate devices. While the indexer 34 is shown as extending from the mounting extension 24 to engage the gear 22, it is contemplated that the indexer may be arranged in a variety of positions to engage the gear 22. Furthermore, it is contemplated, though less preferable, that the indexer 34 may engage the teeth 33 of the temperature indicator stick 12 instead of, or in addition to, engaging the gear 22 to perform the metering and feedback functions described above.

Additionally, referring to FIG. 3, it is contemplated that the housing 14 may include an access opening 36 located opposite the opening 15 designed to allow the temperature indicator stick 12 to pass into and out of the housing 14. Unlike the opening 15 designed to allow the temperature indicator stick 12 to pass into and out of the housing 14, the access opening 36 is sized so that the temperature indicator stick 12 cannot pass therethrough. Rather, the access opening 36 is designed to provide a portal through which a temperature indicator stick 12 that has been disengaged with the control system 18 can be repositioned to reengage the control system 18. For example, after sufficient use, a temperature indicator stick 12 may be partially consumed so that the length of the temperature indicator stick 12 is significantly less than the length of the housing 14. Accordingly, the temperature indicator stick 12 could be accidentally retracted into the housing 14 a sufficient distance so that it becomes disengaged with the control system 18. That is, the shortened temperature indicator stick 12 would be located between the back wall of the housing 14 and the area where the gear 22 extends into the housing. In this case, the access opening 36 provides a portal through which an operator may extend a screw driver, welding wire, or any other sufficiently rigid and slender device into the housing 14 and push the shortened temperature indicator stick 12 back into engagement with the gear 22.

While the teeth 33 formed along the temperature indicator stick 12 are an important component that cooperates with the control system 18 to facilitate movement and control of the temperature indicator stick 12, it should be recognized that the formation of the teeth 33 along the temperature indicator stick 12 must be carefully performed. That is, as stated above, the temperature indicator stick 12 is typically formed from a material that is relatively brittle and susceptible to damage. Hence, attempts to form the teeth 33 using conventional hobbing and milling techniques would result in material fragmentation that, at best, yields a distorted tooth shape and, at worst, a significant reduction in the structural integrity of the temperature indicator stick 12. As such, conventional systems and methods for forming the teeth 33 along the temperature indicator stick 12 typically result in immediate or spontaneous breakage.

To overcome these drawbacks caused by traditional manufacturing systems and methods, it is contemplated that a pressure forming or a scraping technique may be utilized to create a temperature indicator stick 12 having a plurality of teeth 33 formed along its length to form a rack. In particular, it is contemplated that pressure forming may be utilized for mass production of temperature indicator sticks 12 having teeth 33. However, in the case of temperature indicator sticks 12 formed from highly brittle materials, scraping techniques provide increased flexibility with a decreased risk of flaws in the structural integrity of the temperature indicator stick 12.

Scraping is performed by using a tooled scraper having one or more scraping faces designed to create the desired rack profile. By traversing the scraper transversely across the temperature indicator stick 12, slowly deepening cuts are made along the surface of the temperature indicator stick 12. Preferably, the scraping movements are performed by a non-rotary motion that is designed to form the teeth 33 along one or more sides of the temperature indicator stick 12. In accordance with one embodiment, as illustrated in FIG. 1, unnecessary weakening of the structural integrity of the temperature indicator stick 12 is avoided by limiting the teeth 33 to specific faces of the temperature indicator stick 12. However, it is noted that in some cases, such as temperature indicator sticks 12 formed from less-brittle material, the teeth 33 may be formed on multiple or all sides of the temperature indicator stick 12.

Figure 4:
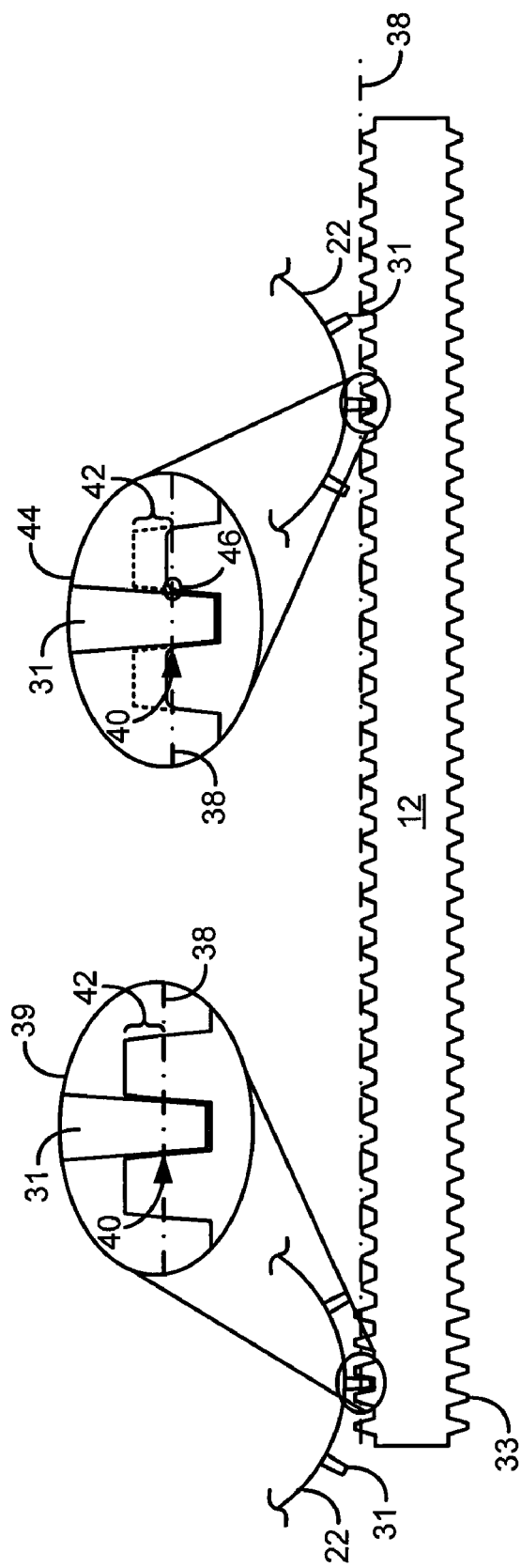
FIG. 4 is a side-elevational view of a temperature indicator stick configured as a rack and an associated gear forming a pinion to control positioning of the temperature indicator stick through the rack.

Referring now to FIG. 4, additional steps can be taken to further reduce the susceptibility of the temperature indicator stick 12 to damage along the teeth 33, such as caused by extending and retracting the temperature indicator stick 12 or, more likely, caused when using the control system 18 to hold against undesired movement of the temperature indicator stick 12, such as when marking an object with the temperature indicator stick 12. In particular, the profile of the teeth 33 can be modified to improve the strength of the teeth 33 against such damage.

A pitch line 38 can be drawn across the teeth 33 where a pitch of the teeth is measured. When the gear 22 is engaged with the teeth 33, contact between the teeth 31 of the gear 22 and the teeth 33 of the temperature indicator stick 12 occurs at a point 40 where the "pitch diameter" of the gear teeth 31 intersect the pitch line 38. Referring to a first magnified view 39, when the teeth 33 are initially formed, a portion of the teeth 33 typically extends substantially above the pitch line 38. The portion of the teeth 33 of the temperature indicator stick 12 that extends substantially above the pitch line 38 is referred to as an addendum 42. When the teeth 33 of the temperature indicator stick 12 include a substantial addendum 42, it is highly probable that a given tooth 31 of the gear 22 will first impact a tooth 33 of the temperature indicator stick 12 above the pitch line 38, on the addendum 42, and "slide" down along the tooth 33 until it engages the tooth 33 along the pitch line 38. This impact of the teeth 31 of the gear 22 with the addendum 42 leads to unnecessary wear upon the temperature indicator stick 12 and can result in damage to the structural integrity of the temperature indicator stick 12, particularly, when the temperature indicator stick 12 is formed from a highly brittle material.

Therefore, as illustrated in a second magnified view 44 included in FIG. 4, it is contemplated that the addendum 42 may be substantially removed so that the teeth 33 of the temperature indicator stick 12 extend only slightly, if at all, above the pitch line 38. Furthermore, any corners 46 formed along the teeth 33 may be rounded to further reduce the probability of the teeth 31 of the gear 22 impacting the teeth 33 of the temperature indicator stick prior to reaching the pitch line 38.

The above-described systems and methods are exemplary and a variety of variations is contemplated. For example, while the teeth described above are shown as being generally rectangular or trapezoidal in shaped, it is contemplated that other shapes may be utilized. For example, instead of traditional gear teeth, a plurality of serrations may be utilized. In this case, a rack having a profile matching the serrations would be included on the temperature indicator stick. Typically, serrations would form a profile of shallow triangles, similar to a thread cross-section or knurling. Additionally, instead of rigid gear teeth, it is contemplated that teeth may be over-molded in a soft urethane that is designed to flexibly engage the temperature indicator stick and drive the stick through a frictional force, as opposed to an interlocking gear and pinion arrangement. Hence, within this arrangement, the temperature indicator stick could be smooth along its interface with the gear so that as the gear is rotated, the soft teeth flex as they engage the temperature indicator stick and propel the stick by friction. Likewise, any of these and the above-described features could be combined.

Figure 5:
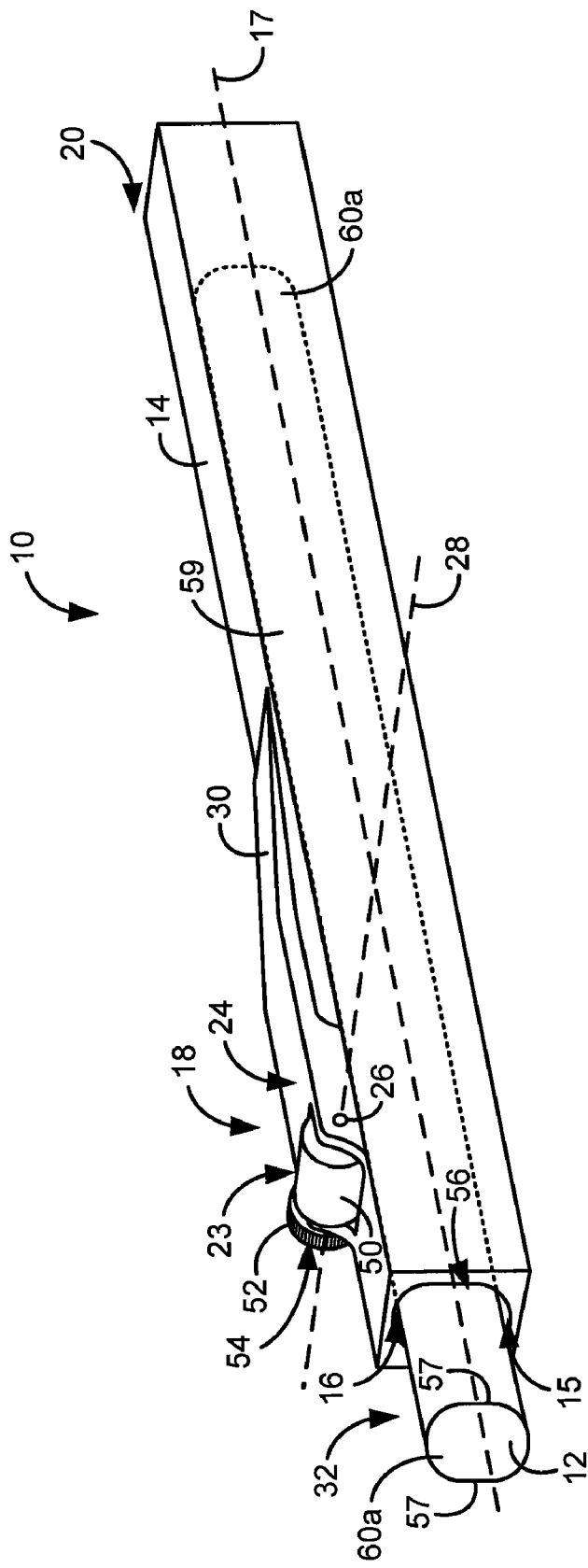
FIG. 5 is a perspective view of the temperature indicating system of FIG. 1 including a frictional driving system and keyed orientation system in accordance with the present invention.

Additionally, referring now to FIG. 5, it is contemplated that both the above-described interlocking gear and pinion arrangement and the soft teeth may be foregone in favor of another frictional drive arrangement. In this case, the actuation mechanism in the form of the gear 22 described with respect to FIGS. 1-4 is replaced with a smooth, frictional, roller drive 50. Like the above-described gear 22, the roller drive 50 is supported in the opening 23 in the housing 14 by the mounting extension 24 that rises above the housing 14. The mounting extension 24 partially surrounds the opening 23 in the housing 14 and receives a pin 26 that extends through opposing sides of the mounting extension 24 to support the roller drive 50 along the rotational axis 28 extending transversely, and substantially perpendicular, to the longitudinal axis 17 of the housing 14. Hence, the roller drive 50 extends into the interior 16 of the housing 14 to engage the temperature indicator stick 12 and extends above the housing 14 and mounting extension 24 to present a surface through which to accurately control the position of the temperature indicator stick 12 within the housing 14. That is, the roller drive 50 can be rotated by engaging the portion of the roller drive extending above the mounting extension 24.

Additionally, it is contemplated that an optional positional control 52 may be included to improve a user's ability to accurately control the position of the temperature indicator stick 12 by driving the roller drive 50, particularly, when wearing welding gloves. To this end, the positional control 52 may be formed as a disk that, like the roller drive 50, is mounted on the pin 26, such that rotation of the positional control 52 causes reciprocal rotation of the roller drive 50. It is contemplated that the positional control 52 may be formed out of a substantially rigid material, such as plastic, to provide an improved surface for a user to engage over the flexible roller drive 50. Beyond improving a user's ability to access the positional control 52 by mounted the control adjacent the mounting extension, such that the whole of the positional control 52 is exposed, the positional control may also have a serrated edge 54. In this regard, the serrated edge 54 improves a user's ability to easily rotate the roller drive 50 over attempting to directly rotate the roller drive 50 by engaging the substantially smooth surface of the roller drive 50.

Since the present invention is capable of driving a temperature indicator stick through frictional force, the present invention has been specifically designed to be capable of receiving prior-art temperature indicator sticks having substantially smooth surfaces or minor variations in the outer surface of the temperature indicator stick. Because many of these prior-art temperature indicator sticks are not perfectly symmetrical or round, it is possible to insert a temperature indicator stick into the housing 12 longitudinally rotated from a preferred orientation that would provide optimal engagement between the temperature indicator stick and the drive roller 50. For example, such rotation may, in some configurations, exceed 45 degrees and cause a loss of engagement between the drive roller 50 and the temperature indicator stick. Accordingly, the temperature indicator stick may be subjected to spontaneous expulsion from the housing 14, fall, and fragmentation. Furthermore, even if the rotation angle is substantially less, for example 15 degrees, engagement between the temperature indicator stick and the drive roller 50 may be along a small minority of the surface of the temperature indicator stick, which could cause damage or deformation of the drive roller 50 and/or the temperature indicator stick.

In order to ensure that a proper frictional force is maintained between the roller drive 50 and the temperature indicator stick 12 to provide smooth and accurate control over extension and retraction of the temperature indicator stick 12 from the housing 14, it is contemplated that a keying system may be employed. For example, as illustrated in FIG. 5, a keying system 56 may be created by forming the opening 15 to have a geometry matched to a keyed shape 57 of the temperature indicator stick 12. In the illustrated case, the keying system 56 may employ a geometry as simple as an oval or a circle having a flattened portion(s). The keyed shape 57 shown as flat portions 57 extend along the temperature indicator stick 12. More particularly, it is contemplated that the keyed shape 57 formed on the temperature indicator stick 12 extend in a substantially straight line along the length of a shaft 59 formed by the temperature indicator stick 12 between respective ends 60a, 60b of the temperature indicator stick 12. Accordingly, regardless of the level of consumption of the temperature indicator stick 12, the keyed shape will be present to properly align the temperature indicator stick 12.

Figure 6A:
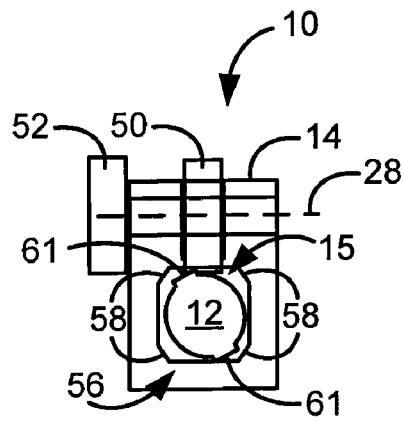
FIGS. 6a and 6b are front-elevational views of another keyed orientation system in accordance with the present invention.
Figure 6B:
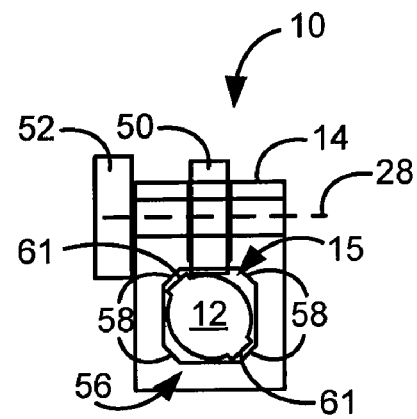

Referring now to FIGS. 6a and 6b, it is contemplated that a more restrictive keying system 56 may be employed to more accurately restrict the longitudinal rotational freedom of the temperature indicator stick 12 within the housing 14. In the illustrated configuration, the opening 15 includes opposing guide surfaces 58 designed to loosely engage matching protrusions 61 from the temperature indicator stick 12. Again, the protrusions 61 extend along a length of the temperature indicator stick 12. As illustrated in FIG. 6a, the extreme rotation permitted within this configuration is relatively small with respect to the preferred orientation illustrated in FIG. 6b. For example, in accordance with one embodiment, it is contemplated that the extent of longitudinal rotation of the temperature indicator stick 12 between FIGS. 6a and 6b is approximately 4 degrees.

Figure 7A:
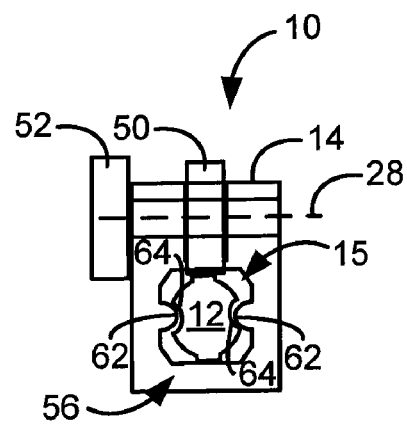
FIGS. 7a and 7b are front elevational views of yet another keyed orientation system in accordance with the present invention.
Figure 7B:
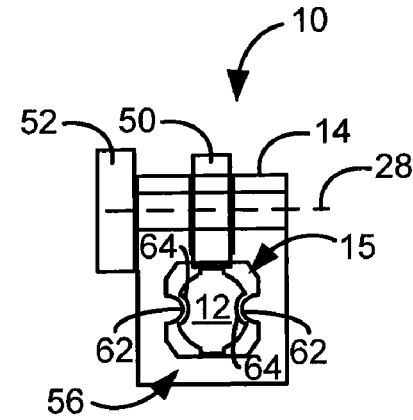

Referring now to FIGS. 7a and 7b, the temperature indicator system 10 may be further adapted to include a self-correcting alignment system. Specifically, one or more alignment guides 62 may be included that extend into the opening 15 within the housing 14. Accordingly, reciprocal mating structures 64, in this configuration formed as alignment troughs, are formed in the temperature indicator stick 12. With this arrangement, the temperature indicator stick 12 is only permitted to rotate a small amount, as illustrated in FIG. 7a. In fact, when the temperature indicator stick 12 is misaligned as illustrated in FIG. 7a, the downward pressure applied by the drive roller 50 to the temperature indicator stick 12 forces the temperature indicator stick to realign as illustrated in FIG. 7b. Accordingly, a self-correcting alignment system is provided.

Therefore, the above-described system and method facilitates the creation of a temperature indicator stick 12 having a plurality of teeth 33 extending along its length to form a rack. The above-described manufacturing systems and methods allow such a temperature indicator stick 12 to be created without weakening the structured integrity of the temperature indicator stick. When coupled with the above-described control system 18, a temperature indicator system 10 is created that facilitates accurate adjustment of the position of a temperature indicator stick 12 with respect to the associated housing 14. As such, the system 10 can be controlled using only a single hand, even when wearing gloves or the like.

Furthermore, the above-described system and method facilitates the creation of a temperature indicator stick system 10 having a drive mechanism in the form of a drive roller 50 that frictionally drives the temperature indicator stick 12 to extend from and retract into the housing 14. Additionally, a keying system may be employed that ensures proper alignment of the temperature indicator stick system 10 within the housing 14.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. A temperature indicator stick system configured to indicate a predetermined temperature when exposed to the predetermined temperature, the temperature indicator stick system comprising:
    a housing having an interior configured to receive a temperature indicator stick;
    a drive roller supported by the housing to engage the temperature indicator stick, the housing including a first opening configured to allow the temperature indicator stick to advance out from and retract into the housing and a second opening through which the drive roller extends to engage the temperature indicator stick;
    wherein the temperature indicator stick includes a keyed shape and the first opening has geometry matched to the keyed shape; and
    wherein rotation of the drive roller causes at least one of retraction and advancement of the temperature indicator stick to and from the interior of the housing.

2. The temperature indicator stick system of claim 1 wherein the drive roller is engaged with the temperature indicator stick and applies a predetermined pressure to frictionally drive the temperature indicator stick to and from the interior of the housing.

3. The temperature indicator stick system of claim 1 further comprising at least one positional controller configured to cause rotation of the drive roller.

4. The temperature indicator stick system of claim 3 wherein the positional controller includes a disk having a plurality of serrations configured to increase a frictional force during actuation of the positional controller.

5. The temperature indicator stick system of claim 1 wherein the drive roller is substantially smooth along a surface engaged with the temperature indicator stick.

6. The temperature indicator stick system of claim 1 wherein the keyed shape includes one of a protrusion and a trough.

7. The temperature indicator stick system of claim 6 wherein the keyed shape extends in a substantially straight line along the temperature indicator stick and wherein the geometry of the first opening holds the temperature indicator stick, through the keyed shape, in a substantially fixed axial position with respect to the housing as the temperature indicator stick is moved to and from the interior of the housing through the first opening.

8. A temperature indicator stick system configured to indicate a predetermined temperature when exposed to the predetermined temperature, the temperature indicator stick system comprising:
    a housing having an interior configured to receive a temperature indicator stick;
    a drive roller supported by the housing to engage the temperature indicator stick, the housing including a first opening configured to allow the temperature indicator stick to advance out from and retract into the housing and a second opening through which the drive roller extends to engage the temperature indicator stick;
    a mounting extension extending from the housing and surrounding the second opening and a pin extending through the mounting extension to support the drive roller thereon; and
    wherein rotation of the drive roller causes at least one of retraction and advancement of the temperature indicator stick to and from the interior of the housing.

9. The temperature indicator stick system of claim 8 further comprising a positional controller mounted on the pin and, wherein movement of the positional controller causes reciprocal rotation of the drive roller to selectively advance and retract the temperature indicator stick to and from the interior of the housing.

10. A temperature indicator stick system configured to indicate a predetermined temperature, the temperature indicator stick system comprising:
    a housing extending along a longitudinal axis to form a substantially hollow interior along the longitudinal axis;
    a drive mechanism supported by the housing;
    a temperature indicator stick arranged within the interior of the housing and having a keyed shape extending along the longitudinal axis;
    an opening formed at one end of the longitudinal axis to provide access to the hollow interior and having a geometry configured to mate with the keyed shape formed on the temperature indicator stick;
    wherein actuation of the drive mechanism causes at least one of retraction and advancement of the temperature indicator stick to and from the interior of the housing through the opening; and
    wherein the geometry of the opening holds the temperature indicator stick, through the keyed shape, in a substantially fixed axial position with respect to the housing as the temperature indicator stick is moved to and from the interior of the housing through the opening.

11. The temperature indicator stick system of claim 10 wherein the drive mechanism includes a drive roller having a rotational axis substantially perpendicular to the longitudinal axis.

12. The temperature indicator stick system of claim 11 wherein rotation of the drive roller about the rotational axis causes linear motion of the temperature indicator stick along the longitudinal axis.

13. The temperature indicator stick system of claim 10 wherein the geometry of the opening includes at least one of a protrusion and a trough.

14. The temperature indicator stick system of claim 10 wherein the drive mechanism is configured to drive the temperature indicator stick through a frictional force.

15. The temperature indicator stick system of claim 10 wherein the keyed shape includes at least one of a flattened portion of the temperature indicator stick, a protrusion from the temperature indicator stick, and a trough formed in the temperature indicator stick.

16. The temperature indicator stick system of claim 10 further comprising a position control coupled to the drive mechanism to selectively actuate the drive mechanism to cause linear motion of the temperature indicator stick along the longitudinal axis.

17. A temperature indicator stick configured to indicate a predetermined temperature, the temperature indicator stick comprising:
- an elongated stick extending from a first end to a second end to form a shaft extending therebetween, the elongated stick formed of a matter configured to indicate a predetermined temperature through at least one of physical and chemical change when exposed to the predetermined temperature; and
- a keyed shape including at least one of a protrusion and a trough, wherein each of the at least one of a protrusion and a trough are extending in a substantially straight line along the shaft between the first end and the second end.

* * * * *